Inventor
Albert M. Van Blarcom
by J. F. McDevitt
His Attorney

Inventor
Albert M. Van Blarcom
by J. F. McDevitt
His Attorney

Inventor
Albert M. Van Blarcom
by J. F. McDevitt
His Attorney

Inventor
Albert M. Van Blarcom
by J. F. McDevitt
His Attorney

Inventor
Albert M. Van Blarcom
by J. F. McDevitt
His Attorney

Inventor
Albert M. Van Blarcom
by J.F. McDevitt
His Attorney

Inventor
Albert M. Van Blarcom
by J F McDevitt
His Attorney

United States Patent Office 3,508,252
Patented Apr. 21, 1970

3,508,252

ANALOG TO DIGITAL AND DIGITAL TO ANALOG SIGNAL CONVERTERS

Albert M. Van Blarcom, Pittsfield, Mass., assignor to General Electric Company, a corporation of New York Filed Oct. 3, 1966, Ser. No. 583,713
Int. Cl. H03k *13/20*
U.S. Cl. 340—347 11 Claims This invention relates to new and improved signal converters.

More particularly, the invention relates to signal converters of the type for converting analog signals to digital signals having a digital value representative of the value of the input analog signal, converters for converting digital signals of one value to digital signals of another value, etc.

With the continuing improvements in high speed automated tools, etc., there has arisen a growing need for higher speed and greater accuracy in the synchro mechanisms employed in the control of such tools. One feature which has been introduced as a result of this need has been the inclusion of additional synchro channels for developing (in addition to the synchro signals representative of the actual position, rate, etc., of the tool being controlled) signals which are representative of multiples of the actual speed, such as 36 times (36×) the actual speed of the equipment being controlled. Thus, a fine position control has been introduced in addition to the coarse control previously provided.

The introduction of the additional fine position control channel placed greater emphasis on the accuracy of the synchro signal processing, and this in turn resulted in the employment of digital techniques in the system. As a consequence, a need has arisen for greatly improved, faster responding, higher accuracy analog to digital and digital to analog converters for use in such systems at the interface between the analog and digital portions of the system. To meet this need it was essential that the converter be all electronic in nature, require a minimum of parts and be susceptible to micro-miniaturization to the greatest possible extent.

It is therefore a primary object of the present invention to provide a new and improved signal converter for converting analog signals to digital signals.

Another object of the invention is to provide an analog to digital signal converter which is all-electronic, highly accurate, fast responding, requires a minimum number of transformers and is susceptible to micro-miniaturization to a great extent.

A further object of the invention is the provision of an analog to digital converter having the above characteristics which provides both coarse and fine signal processing channels and further is capable of multiplexed operation with any desired number of signal sources.

A still further object of the invention is the provision of a converter for converting digital signals of one value to digital signals of a selected different value for use in digital to analog converters and the like.

In practicing the invention an analog to digital converter for converting analog signals to digital signals, having a digital value representative of the value of the input analog signal, is provided. The converter is comprised by differential resolving means for combining signals in analog form to signals in digital form and for deriving a resultant output signal representative of the sum of the applied input signals. Reversible counting means are provided having its input operatively coupled to the output of the differential resolving means for deriving a pulsed wave form digital output signal, the pulse count of which in digital form represents the value of the resultant signal from the differential resolving means.

Adding means are coupled to the output from the reversible counting means for adding together the outputs from selected counter stages thereof, and means are provided for coupling the output from the adding means back to the input of the differential resolving means in a closed loop feedback manner as one of the input signals thereto. In a preferred embodiment of the invention the adding means is a digital adding means for adding the output from at least two counter stages of the reversible counting means in digital form and supplying the resultant sum signal to the differential resolving means in digital form. It is also preferred that the converter include both coarse and fine differential resolving means each having their output operatively coupled to the input of the reversible counting means with the coarse differential resolving means having coarse value analog signals supplied thereto and the fine differential resolving means having fine value analog signals supplied thereto. It is also anticipated that the new and improved converter according to the invention be employed in a multiplexed system for use in conjunction with a plurality of input analog signal sources.

Other objects, features, and many of the attendant advantages of this invention will be appreciated more readily as the same become better understood by reference to the following detailed description, when considered in connection with the accompanying drawings, wherein like parts in each of the sevaral figures are identified by the same reference character, and wherein.

Figure 1:
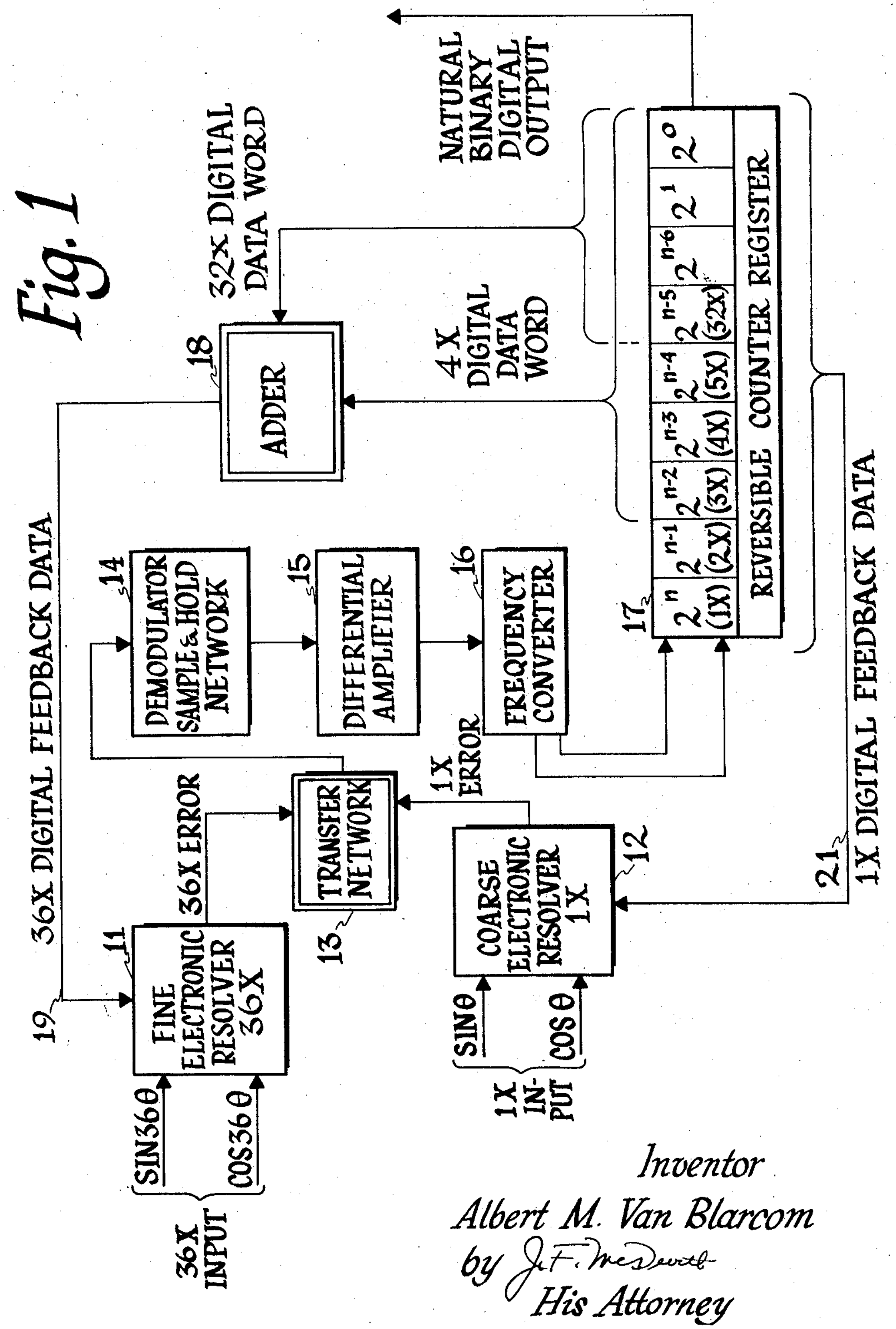
FIGURE 1 is a functional block diagram of a new and improved analog to digital signal converter constructed in accordance with the invention.

The new and improved analog to digital signal converter shown in FIGURE 1 of the drawings is comprised by a fine electronic differential resolver 11 and a coarse electronic differential resolver 12. The coarse electronic differential resolver 12 has two input signals applied thereto in analog form which are representative respectively of the sine and cosine of the analog signal generated, for example, by a synchronously operable generator attached to an automated machine tool being controlled. Assume for convenience that this signal is representative of the position of the machine tool being controlled, then the input of the coarse electronic resolver 12 would correspond to the sine and cosine, respectively, of the actual position signal $\theta$. Coarse electronic resolver 12 has a third input signal $\phi$ supplied thereto which is digital in nature, and which constitutes a feedback reference signal. Resolve 12 serves to combine the two input analog signals with this digital feedback reference signal $\phi$, and derives at its output an output error signal. The construction and operation of the coarse electronic resolver 12 will be described more fully hereinafter in connection with FIGURES 2 through 4.

The fine electronic resolver 11 is similar in construction and operation to the coarse electronic resolver 12 but differs therefrom in that the two analog signals supplied thereto are representative of the sine and cosine of a position signal which is 36 times as fast as the actual position of the equipment being controlled, or $36\theta$. Correspondingly, the digital feedback reference signal supplied to the third input of the fine electronic resolver 11 is representative of the 36 times position signal $36\phi$ in digital form. Fine electronic resolver 11 serves to combine the two analog inputs sin $36\theta$ and cos $36\theta$ with the digital input $36\phi$ to derive an output error signal which is representative of the 36 times of fine error signal.

The fine error signal appearing at the output of the fine electronic differential resolver 11 and the coarse error signal appearing at the output of the coarse electronic resolver 12 are supplied to the inputs of a transfer network 13 for application to a suitable signal processing channel. The transfer network 13 comprises nothing more than a conventional summing network for summing together the coarse and the fine error signals, and supplying the summed output error signal to the signal processing channel. The signal processing channel includes a demodulator sample and hold network 14 which has its output coupled through a differential amplifier 15 to the input of a voltage to frequency converter 16. The construction and operation of the demodulator sample and hold network 14, the differential amplifier 15 and the voltage to frequency converter 16 are disclosed more fully in copending United States Patent Application 531,111 entitled "Analog to Digital Converter" filed Mar. 2, 1966, now abandoned, by Richard A. Van Patten, Inventor, assigned to the same assignee as the present invention. For a more detailed description of the construction and operation of these circuits, reference is made to the above-identified copending application.

Briefly, however, the signal processing channel comprised by demodulator sample and hold network 14, differential amplifier 15 and voltage to frequency converter 16 serve to demodulate, amplify and convert the error signal appearing at the output of the electronic resolver circuits 11 and 12, and summed by transfer network 13, into a varying frequency output signal. This varying frequency output signal is proportional in frequency and polarity to the instantaneous direct current error signal developed at the output of demodulator sample and hold network 14. The varying frequency output signal is applied to reversible counter 17 and causes the reversible counter 17 to count up or count down at variable rates. As a result, the dynamic variations of the input analog signals are accurately tracked at high angular rates in a digital fashion.

The reversible counter 17 is conventional in construction and may comprise any known form of reversible counter such as those described in the textbook entitled "Logical Design of Digital Computers" by Phister. Such counters are well known in the art, and will not be described in detail. For example, the reversible counter 17 may comprise a conventional Eccles-Jordan bi-stable circuit arranged as a T flip flop with two dynamic AND gates. The presence of a logic 1 at either the up or down line connected to its input which are tied to the add or subtract gate inputs of a flip flop, respectively, serve to condition the counter for operation. A change from a logic 1 to a logic 0 at the clock input advances or decreases the count by 1. Since such devices are well known, a further description is believed unnecessary. However, suffice it to say that the output from the reversible counter 17 is comprised by the output from a number of counter stages such as $2^0$, $2^1$, $2^2$, $2^3$ . . . $2^{N-1}$, $2^N$ which in turn constitute one speed (1×), two speed (2×), four speed (4×) . . . $2^N$ speed ($2^N$×) information. By digitally adding appropriate bits of the counter stages, then any desired speed signal data can be developed.

Because of the fact that outputs from the several counter stages of reversible counter 17 represent multiples of the value of the actual position signal being processed, it is possible by the proper combination of the outputs of selected ones of the counter stages to derive any desired speed position signal. For this purpose adding circuit means shown at 18 is provided and may comprise any conventional adding network such as those described in the above-referenced textbook entitled "Logical Design of Digital Computers" by Phister. The adding circuit 18 has the output from the counter stages representative of the 32 speed (32×) and 4 speed (4×) digital position signals. In order to derive the 32 speed (32×) digital position signal, the first 5 most significant bits ($2^N$ through $2^{N-4}$) of the output of the reversible counter 17 are deleted, and the remainder supplied to adding circuit 18 as one of the inputs thereof. In order to derive the 4 speed (4×) position signal in digital form, the two most significant bits ($2^N$ and $2^{N-1}$) of the output of reversible counter 17 are deleted, and the remainder supplied to adder 18 as the second input thereof. The proper digital addition of these two signals then provides the desired 36 speed (36×) position signal in digital form which is supplied back through a conductor 19 to the input of the fine electronic resolver 11 in a closed feedback loop manner. The electronic resolver 11 then combines this signal with the input analog sine and cosine signals in a manner to be described more fully hereinafter in connection with FIGURES 2 through 4 to develop the output error signal which is representative of the instantaneous difference in the digital 36 speed (36×) reference position signal and the actual analog 36 speed (36×) position signal.

The analog to digital converter shown in FIGURE 1 is completed by a feedback conductor 21 which serves to feed back all of the bits of the output from reversible counter 17 to the input of the coarse electronic resolver 12 in a closed feedback loop manner. This digital signal will then represent in digital form the one speed (1×) position of the equipment being controlled. This digital signal is then compared to the instantaneous values of the incoming analog signals applied to the input of the coarse electronic resolver 12, and the coarse output error signal derived by resolver 12 then represents the instantaneous difference in the value of the one speed (1×) position digital signal from that of the incoming one speed (1×) position analog signals.

In operation it will be seen that the coarse sin $\theta$ and cos $\theta$ analog signals are accepted by the coarse electronic resolver 12 together with the coarse digital feedback signal from the reversible counter 17. The coarse electronic resolver then provides an output analog signal which is proportional to the value sin $(\theta-\phi)$ where $\theta$ is the coarse analog input angle and $\phi$ is the coarse digital feedback angle. Similarly, the sin $36\theta$ and cos $36\theta$ analog signals are accepted by the fine electronic resolver 11 together with the fine digital feedback signal $36\phi$ from the adder 18. The fine electronic resolver 11 then provides an output analog signal proportional to the value $$\sin (36\theta)-36\phi)$$

where $36\theta$ is the fine analog input angle and $36\theta$ is the fine digital feedback angle. The transfer network then sums the coarse and fine analog error signals and supplies the summed error signal through demodulator sample and hold network 14 and differential amplifier 15 to drive the voltage to frequency converter 16 in a manner described more fully in the above-referenced copending application Ser. No. 531,111. In addition to demodulating the output from transfer network 13, the demodulator sample and hold network 14 and differential amplifier 15 also serve loop stabilization functions. The stabilized analog DC error signal developed at the output of differential amplifier 15 is converted to a frequency proportional in frequency and polarity to the instantaneous DC level of the error signal. This variable frequency signal then causes the reversible counter 17 to count up or down at variable rates and, as a result, causes the reversible counter to accurately track the dynamic varitions of the input analog signals at high angular rates. It should be noted that while the fine signal channel has been described as constituting a 36 speed (36×) signal channel, other combinations of synchro input speeds can be accommodated by generating the required multi-speed feedback signal through the addition of appropriate multi-speed digital data contained in the register at its various counter stages. Thus, if it were desired to obtain a 12 speed (12×) signal this could be achieved by appropriately combining the output of the 4 speed (4×) and 8 speed (8×) counter stages of reversible counter 17. Other combinations are of course possible.

Figure 2:
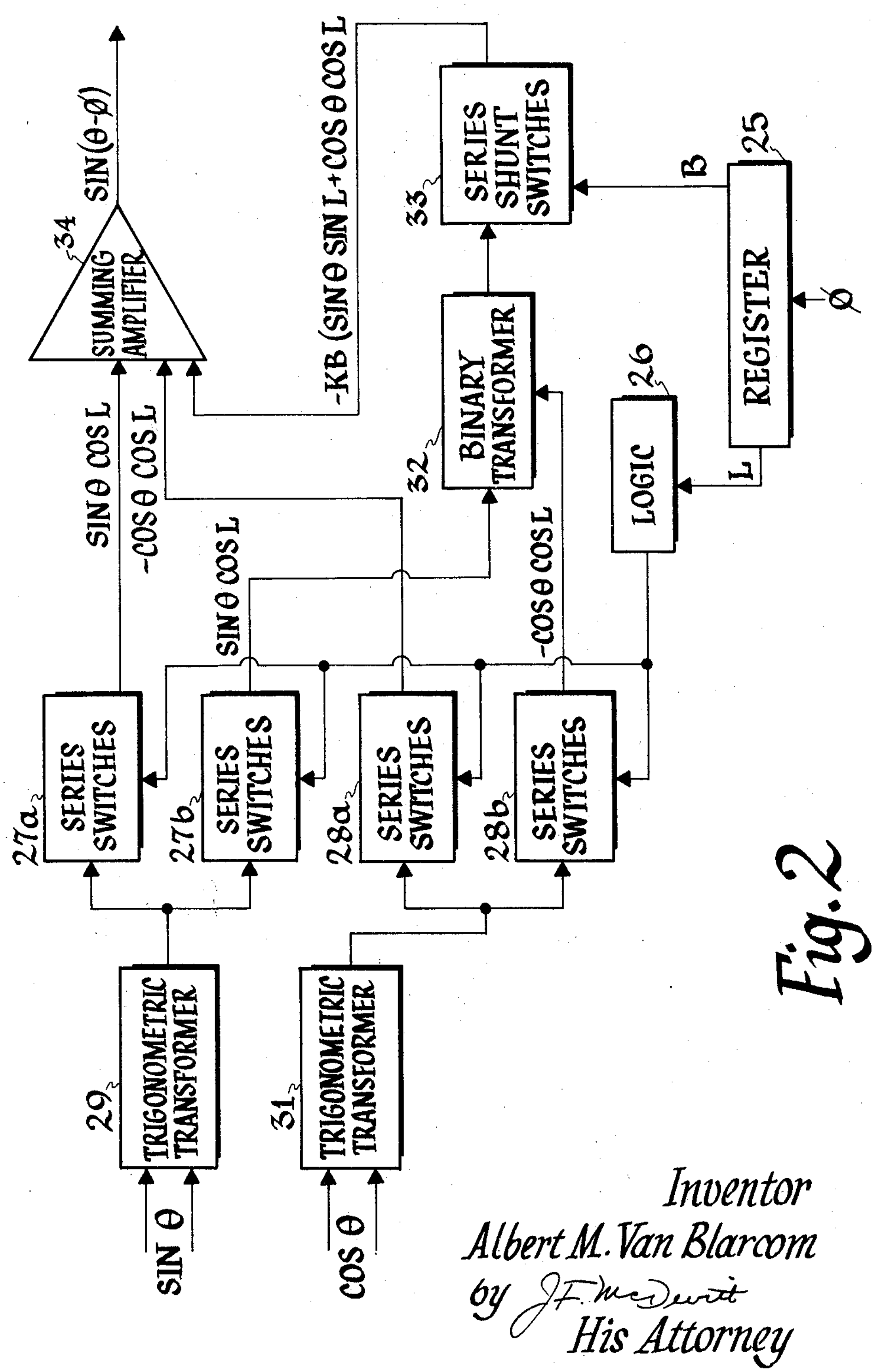
FIGURE 2 is a functional block diagram of an electronic differential resolver comprising a part of the analog to digital converter shown in FIGURE 1.

FIGURE 2 of the drawings is a functional block diagram of the construction of an electronic differential resolver suitable for use as either the fine electronic resolver 11 or the coarse electronic resolver 12. As shown in FIGURE 2, the electronic resolver is comprised by an input register 25 to which the digital feedback signal indicated by the character $\phi$ is supplied. The digital feedback signal $\phi$ recorded in the register 25 is separated into coarse bits indicated by the letter L and fine bits indicated by the letter B. The coarse bits L are supplied to a logic circuit 26 whose output controls the operation of two sets of two series switches 27*a*, 27*b*, and 28*a*, 28*b*. The series switches 27*a* and 27*b* control the tap-off points of a trigonometric transformer 29 to which the analog signal $\sin\theta$ is supplied. The series switches 28*a* and 28*b* control the tap-off points from the secondary winding of a trigonometric transformer 31 to which the analog signal $\cos\theta$ is supplied. The series switches 27*b* and 28*b* have their outputs connected to a binary transformer 32 whose output is supplied through a set of series-shunt switches 33 to the input of summing amplifier 34. The series-shunt switches 33 are controlled by the fine bits B obtained from register 25. The series switch 27*a* has its output supplied directly to the input of summing amplifier 34 as does the series switch 28*a*.

In operation, the summing amplifier 34 serves to sum together the three terms $\sin\theta\cos L$, $-\cos\theta\sin L$ and $-KB(\sin\theta\sin L+\cos\theta\cos L)$ and to derive at its output a signal representative of the term $\sin(\theta-\phi)$. It should be remembered that the quantity $\phi$ here is representative of the digital feedback signal so that in essence the output from the summing amplifier 34 therefore represents the desired difference error signal between the instantaneous value of the applied input analog signal and the value of the digital feedback signal.

From the above brief description it can be appreciated that the function of the electronic differential resolver is to generate the sine or cosine of the sum of two (2) angles or the sine or cosine of the difference of two (2) angles. However, unlike standard resolvers which have an analog angular input and a shaft angular input, the electronic differential resolver has an analog angular input (either $\sin\theta$ and $\cos\theta$ or a three-wire synchro input) and a digital angular input. The particular type of electonic differential resolver here disclosed generates just the sine of the difference between its angular inputs. The following equations provide the basis of operation for this particular converter.

The desired output is $\sin(\theta-\phi)$ and the following relations are involved:

$$\mathrm{Sin}\,(\theta-\phi)=\sin\theta\cos\phi-\cos\theta\sin\phi \quad (1)$$

but $$\theta=L+B$$

where L is the "coarse" bits and B is the "fine" bits of the digital angle so $$\mathrm{Sin}\,(\theta-\phi)=\sin\theta\cos(L+B)-\cos\theta\sin(L+B) \quad (2)$$

but $$\mathrm{Sin}\,(L+B)=\sin L\cos B+\cos L\sin B \quad (3)$$

and $$\mathrm{Cos}\,(L+B)=\cos L\cos B-\sin L\sin B \quad (4)$$

so $$\mathrm{Sin}\,(\theta-\phi)=\sin\theta\cos L\cos B-\sin\theta\sin L\sin B -\cos\theta\sin L\cos B-\cos\theta\cos L\sin B \quad (5)$$

rearranging (5) results in $$\mathrm{Sin}\,(\theta-\phi)=\cos B\,(\sin\theta\cos L-\cos\theta\sin L) -\sin B\,(\sin\theta\sin L+\cos\theta\cos L) \quad (6)$$

dividing (6) by cos B yields $$\frac{\mathrm{Sin}\,(\theta-\phi)}{\mathrm{Cos}\,B}=\sin\theta\cos L-\cos\theta\sin L -\tan B(\sin\theta\sin L+\cos\theta\cos L) \quad (7)$$

If B is a small angle, two (2) approximations can be made:

(1) $\mathrm{Sin}\,(\theta-\phi)/\cos B$ is approximately equal to $\sin(\theta-\phi)$ and (2) Tan B is approximately equal to KB where K equals $$\frac{(1+B_{\mathrm{Max}}^2)}{4}$$

From a consideration of the above equations it can be appreciated that the output of the summing amplifier 34 represents $$\sin\theta\cos L-\cos\theta\sin L-KB\,(\sin\theta\sin L+\cos\theta\cos L)$$

The terms $\sin\theta\sin L$, $\sin\theta\cos L$, $\cos\theta\sin L$ and $\cos\theta\cos L$ are all obtained by selecting the proper taps on the trigonometric transformers 29 and 31 through appropriate actuation of the series switches 27*a*, 27*b*, 28*a* and 28*b*.

Figure 3:
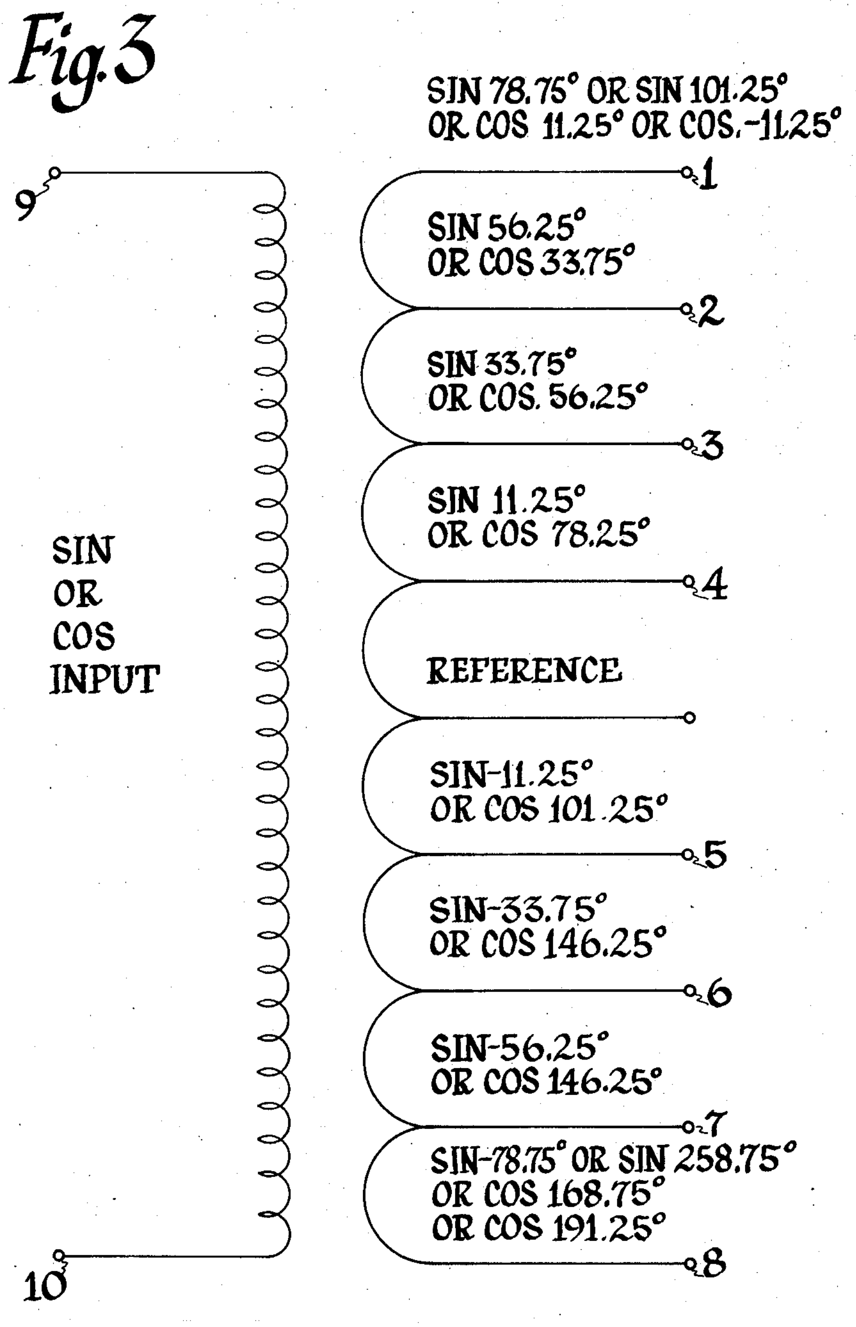
FIGURE 3 is a schematic wiring diagram of a trigonometric transformer comprising a part of the electronic differential resolver shown in FIGURE 2.

A suitable mechanization for the trigonometric transformer is illustrated in FIGURE 3 of the drawings. The angles represented by the transformer taps are related to the upper bits (L) of the digital feedback angle $\phi$. The most significant bit of the digital feedback angle $\phi$ represents 180°, the next bit 90°, the next bit 45°, the next bit 22.5°, etc. For instance, if L were 0000, tap 4 would be selected for the sine L function and tap 1 for the cosine L function. The 11.25 degree taps are selected because B can be any angle between +11.25° and −11.25°. The 0000 in the upper four (4) bits indicates that the digital feedback angle $\phi$ is greater than or equal to 0° but less than 22.5°. The electronic differential resolver could have been mechanized by allowing B to have a range of 0° to 22.5° in which case the trigonometric transformers would have taps at 0°, 22.5°, 45°, etc.; however, this means that the maximum B would be 22.5° rather than 11.25°. It should be noted however that doubling the size of the maximum B would greatly reduce the accuracy of the approximations made for tangent B and the electronic differential resolver output. By use of a simple mechanization shift where trigonometric taps are all shifted by one-half a segment (11.25° in this case), cuts the maximum B value in half. This means that the binary transformer must be tapped over an interval from −11.25° to +11.25° rather than an interval from 0° to 22.5°. In each case the transformer cost is essentially unaffected by the change, however, the logic controlling the selection of the taps must be modified to account for the half segment shift.

Figure 4:
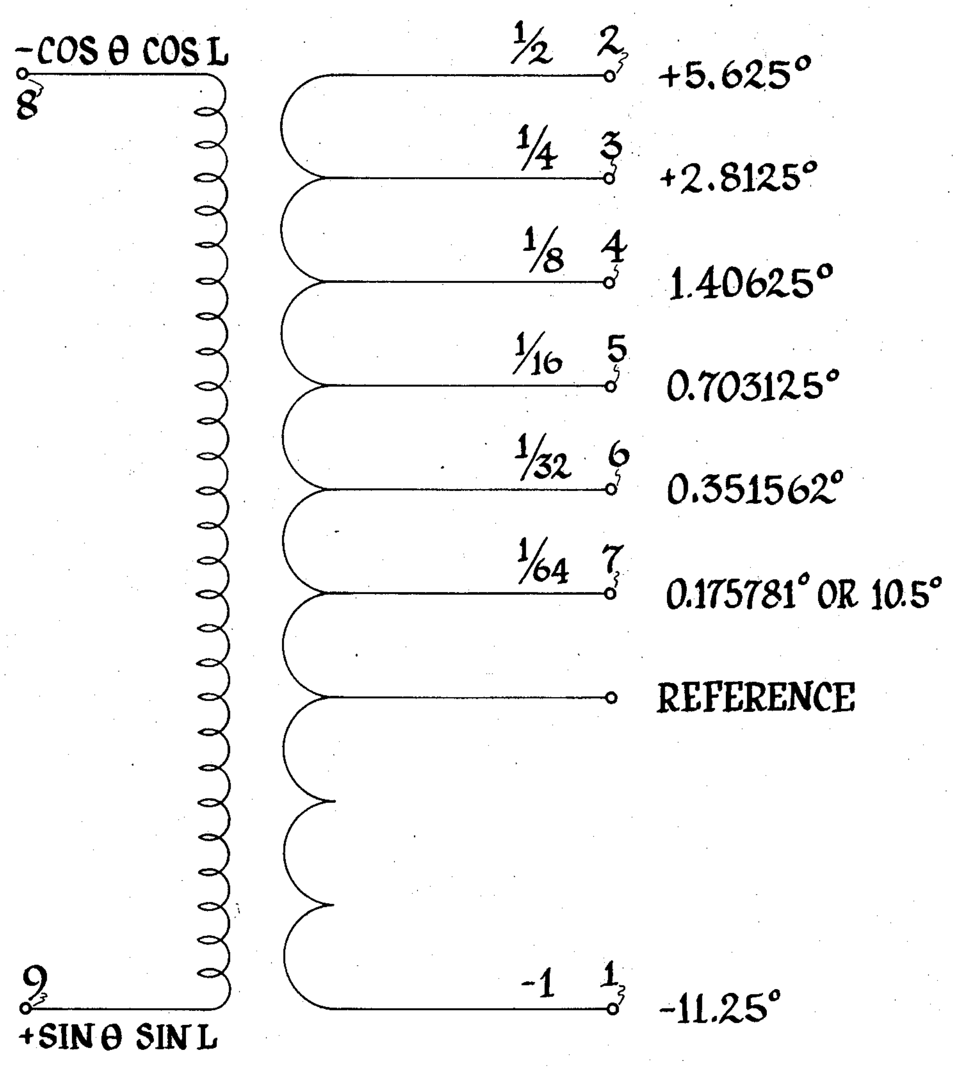
FIGURE 4 is a schematic wiring diagram of a binary transformer comprising a part of the electronic differential resolver shown in FIGURE 2.

In operation the logic circuit 26 activates the two sets of two series switches 27*a*, 27*b* and 28*a*, 28*b* of the two trigonometric transformers 29 and 31 to generate the four terms $-\sin\theta\cos L$, $\sin\theta\sin L$, $\cos\theta\cos L$ and $\cos\theta\cos L$. The $\sin\theta\cos L$ and $-\cos\theta\cos L$ terms are sent directly to the summing amplifier 34. The minus KB (−KB) term is provided by selecting the appropriate taps on binary transformer 32. The $\sin\theta\sin L$ and $-\cos\theta\cos L$ terms are added in the primary of binary transformer 32. FIGURE 4 of the drawings illustrates a suitable binary transformer design for this purpose. The particular binary transformer shown in FIGURE 4 is mechanized for 7 bits. If it were used in conjunction with the trigonometric transformer shown in FIGURE 3, the electronic differential resolver would be an 11 bit device, L being 4 bits and B being 7 bits. The NOT function of the most significant bit of B controls the negative tap on the binary transformer. Using the NOT function to control the negative tap compensates for the half segment shift on the trigonometric transformers. The result of this mechanization is that if the upper five bits of the digital feedback angle $\theta$ are 00000 then $+11.25°$ is selected on the trigonometric transformers and $-11.25°$ is selected on the binary transformer so that the net effect of the upper five bits is 0°. The K term is factored in by the turns ratio of the binary transformer and by the value of the summing resistors used to sum the outputs of the binary transformer. All taps on the binary transformer, except for the most significant, are controlled by the function side of the appropriate bits of B. As an example, if the digital feedback angle $\theta$ is equal to 00000011000, this would cause selection of taps 1, 3 and 4 on the binary transformer and taps 1 and 4 on both trigonometric transformers.

The summing amplifier 34 serves to sum the terms $\sin\theta\cos L$, $-\cos\theta\sin L$ and the output from the binary transformer to yield an output signal of $$\sin\theta\cos L-\cos\theta\sin L-KB\,(\sin\theta\sin L+\cos\theta\cos L)$$

which is equal to the desired output signal $\sin(\theta-\phi)$ as set forth in Equation 7 above. This electronic differential resolver is a relatively coarse device with a resolution of 10.5 arc minutes, a peak systematic error of 2.17 arc minutes due to the approximation for tangent B and a peak transformation ratio (TR) error of 1.96% due to the fact that the output actually is $$\frac{\mathrm{Sin}(\theta-\phi)}{\mathrm{Cos}\,B}$$

rather than exactly $\sin(\theta-\phi)$. The approximation, however, is sufficiently accurate for most applications of the circuit.

Figure 5:
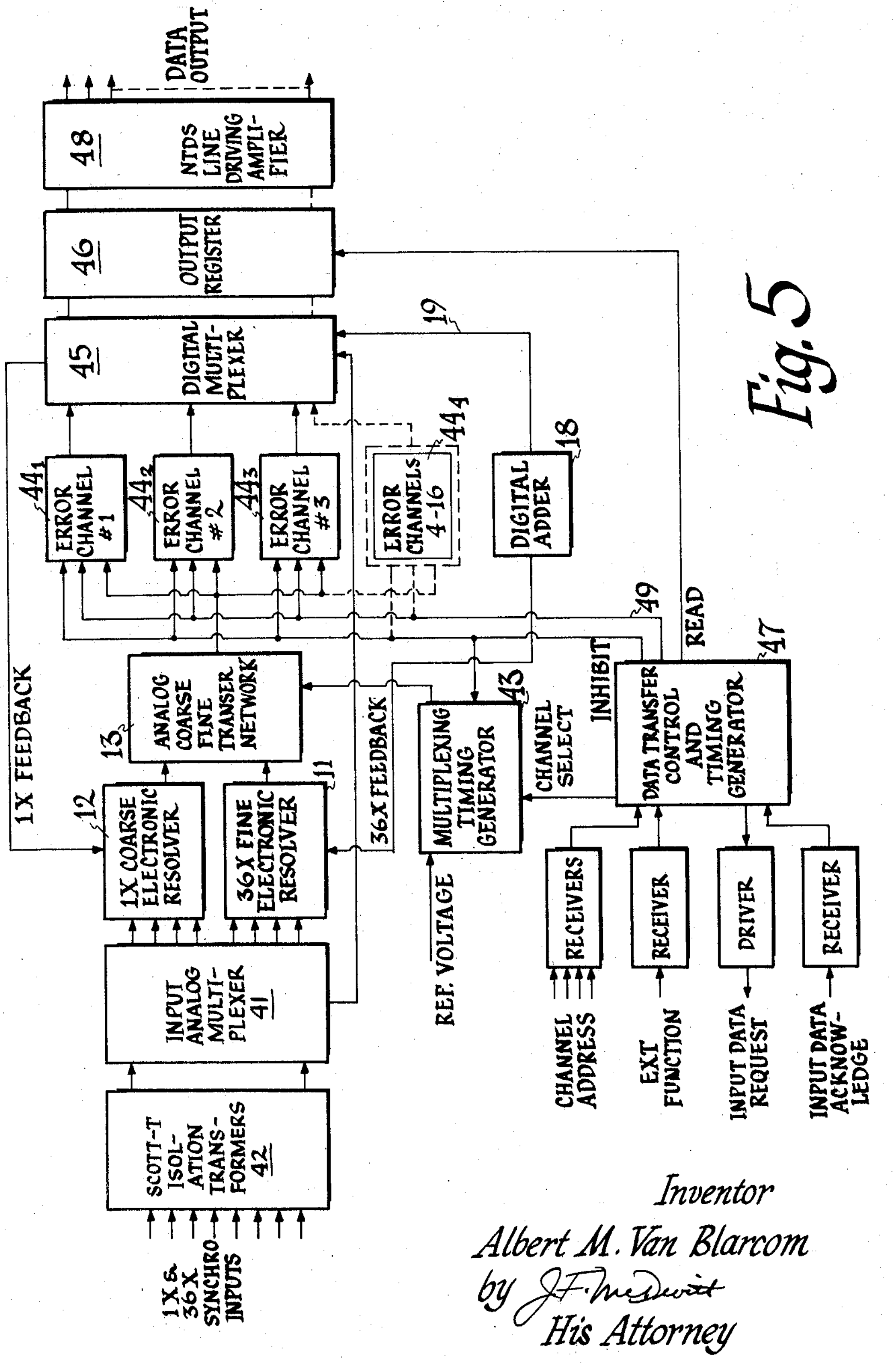
FIGURE 5 is a functional block diagram of a multiplexed analog to digital signal converter constructed in accordance with the invention.

FIGURE 5 of the drawings illustrates a multiplexed analog to digital converter constructed in accordance with the teachings of the present invention. The multiplexed converter shown in FIGURE 5 is comprised by an input analog multiplexer 41 which serves to switch the proper analog signals into the coarse and fine electronic differential resolvers 12 and 11, respectively. The analog multiplexer 41 receives the analog input signals from the output of a plurality of Scott-T transformers 42 and a control timing input signal from a multiplexing timing generator 43. The timing generator 43 counts down from a 400-cycle-per-second reference voltage to provide the required timing signals for control of the multiplexed converter. The coarse and fine electronic differential resolvers 12 and 11 accept, in time sequence, analog and digital input signals corresponding to each of the several input channels. The output from each of the coarse and fine electronic differential resolvers 12 and 11 is multiplexed through an analog coarse-fine transfer network 13 also controlled by the multiplexing timing generator 43. The transfer network 13 serves to apply the appropriate error signal developed from the outputs of the coarse and fine electronic differential resolvers 12 and 11 to an appropriate signal processing channel $44_1$, $44_2$, $44_3$, $44_4$, etc., there being one signal processing channel 44 for each of the sets of coarse and fine input analog signals.

The signal processing channels 44 are comprised by a demodulator sample and hold network 14, a differential amplifier 15, a voltage to frequency converter 16, and a reversible counter 17 as was described with respect to FIGURE 1 of the drawings and disclosed more fully in copending application Ser. No. 531,111. As a consequence each sample and hold demodulator samples the multiplexed error signal at the proper time and holds the information in an RC network until the next sample time. Each demodulator sample and hold network provides the holding function as well as the loop stabilization and noise filtering functions required by the circuit. Each differential amplifier of the signal processing channels accepts and amplifies the differential output of the demodulator sample and hold network and also provides a loop bias adjustment for each channel. The voltage to frequency converter in each channel accepts the differential amplifier output and converts the analog DC error voltage to a frequency proportional to the magnitude and polarity of the DC analog error signal. The positive or negative frequency, determined by up-count or down-count outputs from the voltage to frequency converters, causes each reversible counter to count up or down at the proper rate to track the velocity of the synchro driving its channel so that the lag error is always within a prescribed tolerance at anytime during or between sample times.

From the foregoing description is can be appreciated that each reversible counter in all of the signal processing channels 44 are cyclically and continuously updated to the proper binary number. The output from each reversible counter is supplied through a digital multiplexer 45 that provides both output and feedback multiplexing. The digital multiplexer 45 accepts up to sixteen 15-bit binary inputs from the reversible counters in the signal processing channels 44 and provides sequential 15-bit binary outputs. These binary output signals are sent to the coarse electronic differential resolver through a feedback conductor 21 and through a feedback conductor 19 and speed converter (digital adder 18) to the fine electronic differential resolver 11. The binary output signals are also sent by the digital multiplexer 45 to an output register 46 on a demand basis as determined by the read-out signals from a data transfer control and timing generator 47, for example. Data read into the output register 46 may then be supplied through a driving amplifier 48 to the data output channels as desired. Because the construction and operation of such elements as the analog multiplexer, the digital multiplexer, the output register, etc., are all conventional, which are commercially available items, they have not been described in detail. For example, see the above-identified reference text by Phister entitled "Logical Design of Digital Computers" for a more detailed description of such items.

From the foregoing description it can be appreciated that the multiplexed analog to digital converter shown in FIGURE 5 is controlled by the multiplexing timing generator 43 which supplied timing signal pulses to the input analog multiplexer 41, the analog coarse-fine transfer network 13 and the digital multiplexer 45. The multiplexing timing generator 43 is in turn controlled by 400-cycle-per-second reference voltage supplied thereto and by the data transfer control and timing circuit 47 which supplies channel address logic to timing generator 43.

The multiplexed analog to digital converter is controlled by the multiplexing timing generator 43 except during data transfer to the output register 46 during which time the control is derived from the data transfer control circuit 47. The data transfer control timing circuit 47 interrupts the timing generator 43 control of the multiplexed converter on receipt of an external function input and places the sample and hold demodulator in each of the signal processing channels 44 in a "hold" condition. The multiplexed analog to digital converter is then operatively coupled into the channel indicated by the contents of the channel address fed into the data transfer timing circuit 47. Data is transferred into the output register 46 upon application of a clock pulse from the data transfer control logic 47. The clock pulse is not transmitted until the data in the channel register is stable, as indicated by the absence of a blanking pulse from the channel voltage to frequency converter supplied over the conductor 49. Control of the multiplexed analog to digital converter is then returned to the timing generator 43 and an input data request signal is transmitted to the computer. The remaining interface sequencing involves the scanning of the input data and the relay of an input acknowledge signal by the computer controlling the converter. Following this, the data transfer cycle may be repeated.

It should be noted however that after connection by the multiplexers of an appropriate signal processing channel 44 into a closed loop system, and the application thereto of an appropriate analog signal from the selected source, the analog to digital converter functions in precisely the same manner as was described with relation to FIGURE 1 of the drawings to cause the reversible counter of the selected channel to accurately track the dynamic variations of the input analog signal at high angular rates.

Figure 6:
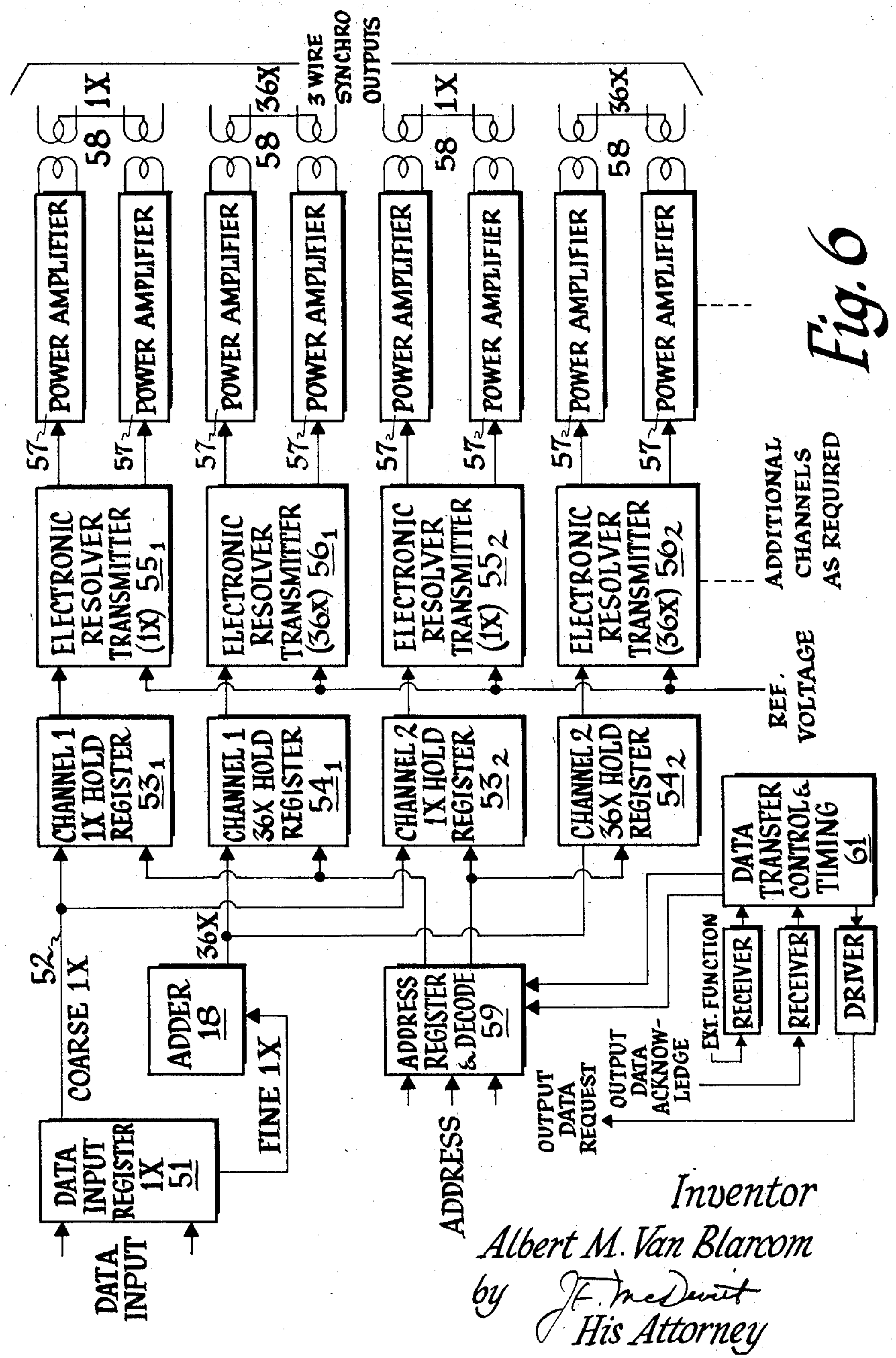
FIGURE 6 is a functional block diagram of a multiplexed digital to analog signal converter constructed in accordance with the teachings of the present invention.

FIGURE 6 of the drawings is a functional block diagram of a multiplexed digital to analog converter constructed in accordance with the invention. The multiplexed digital to analog converter is comprised of a data input register 51 having data in digital form sequentially supplied thereto from a plurality of signal input channels. The sequentially applied digital input data is supplied over a conductor 52 to the input of a plurality of coarse channel registers $\mathbf{53}_1$ and $\mathbf{53}_2$. It should be noted that only two channels are illustrated in the multiplexed digital to analog converter shown in FIGURE 6; however, additional channels can be added as required.

The sequentially applied digital data is also supplied to the input of an adding network 18 which corresponds in function to the adding network 18 employed in the analog to digital converter shown in FIGURE 1. The adding network 18 functions to add together the data from selected register stages (i.e., such as the data from the $2^2$ and $2^5$ stages) and to derive at its output terminals a sum signal representative of a desired speed data. The summed fine digital data derived in this manner from the output of adder 18 is then supplied to the input of the fine channel registers $\mathbf{54}_1$, $\mathbf{54}_2$, etc. By this construction, the sequentially multiplexed data is accepted from the computer by each channel and digitally held by means of a channel register until updating occurs. This method is advantageous in that the digital synchro signal stored in the channel registers may be held indefinitely without the updating ordinarily required with other storage techniques such as capacitor storage.

The output from the channel 1 coarse register $\mathbf{53}_1$ is supplied to a coarse electronic resolver transmitter $\mathbf{55}_1$, and the output from the channel 1 fine register $\mathbf{54}_1$ is supplied to the input of a fine electronic resolver transmitter $\mathbf{56}_1$. Similarly, the output from the channel 2 coarse register $\mathbf{53}_2$ is supplied to the input of a coarse electronic resolver transmitter $\mathbf{55}_2$, and the output from the channel 2 fine register $\mathbf{54}_2$ is supplied to the input of a fine electronic resolver transmitter $\mathbf{56}_2$. The electronic resolver transmitters $\mathbf{55}_1$, $\mathbf{56}_1$, $\mathbf{55}_2$ and $\mathbf{56}_2$ are all similar in construction and operation to the electronic differential resolver 11 and 12 described with relation to the analog to digital converter shown in FIGURE 1 of the drawings. Hence, a detailed description of the construction and operation of these devices is believed unnecessary. Each electronic resolver transmitter is controlled from its associated channel register and receives its analog excitation from a sine/cosine transformer excited from a 400-cycle source of reference voltage. The output from the electronic resolver transmitters is supplied through appropriate power amplifiers 57 to output Scott–T transformers 58.

The multiplexed digital to analog converter is completed by an address register and decoder circuit 59 which controls the operation of the channel registers 53, 54, etc. The address register and decoder circuit 59 is in turn controlled by a data transfer control and timing circuit 61 that receives its commands from the control computer. The system is designed in such a fashion that analog voltages derived from the output of the electronic resolver transmitters 55, 56 will drive the push-pull power amplifiers 57. Amplifiers 57 in turn drive the Scott–T transformer pairs 58 which serve to provide proper matching to an external load. The switching and amplifier circuits are designed to reflect the new values of $\theta$ in the instantaneous values of the output line to line voltages within 50 microseconds of receipt of output acknowledge signals from the computer.

The operation of the digital to analog converter shown in FIGURE 6 is as follows: The output request signal from control and timing circuit 61 is normally present. On receipt of an external function signal from the control computer, channel address data will be transferred into the channel address register 59 by means of a clock pulse generated by the control and timing circuit 61. On receipt of an output acknowledge signal from the control computer, data will be transferred into the proper channel register by means of a clock pulse generated on the proper line by the control and timing circuit 61. The output data request signal is then dropped for an appropriate period of time by means of the control and timing circuit 61. The interrogation cycle is then complete and may be repeated by the control computer at appropriate intervals.

Each of the channel registers 53, 54 activated by the address register and decoder circuit 59 drives its associated electronic resolver transmitter 55, 56 as previously described, there being both a coarse and fine electronic resolver transmitter activated for each channel selected by the control computer. Each electronic resolver transmitter in turn drives its associated push-pull power amplifier with sine and cosine 400 cycles per second analog suppressed carrier modulated analog signals. Each pair of push-pull power amplifiers drives the center tap primaries of a pair of Scott-T connected transformers which provide matching and isolation to the external load. It should be noted however that by reason of the present invention it is possible to derive any desired speed analog output signal from an available digital input signal.

Figure 7:
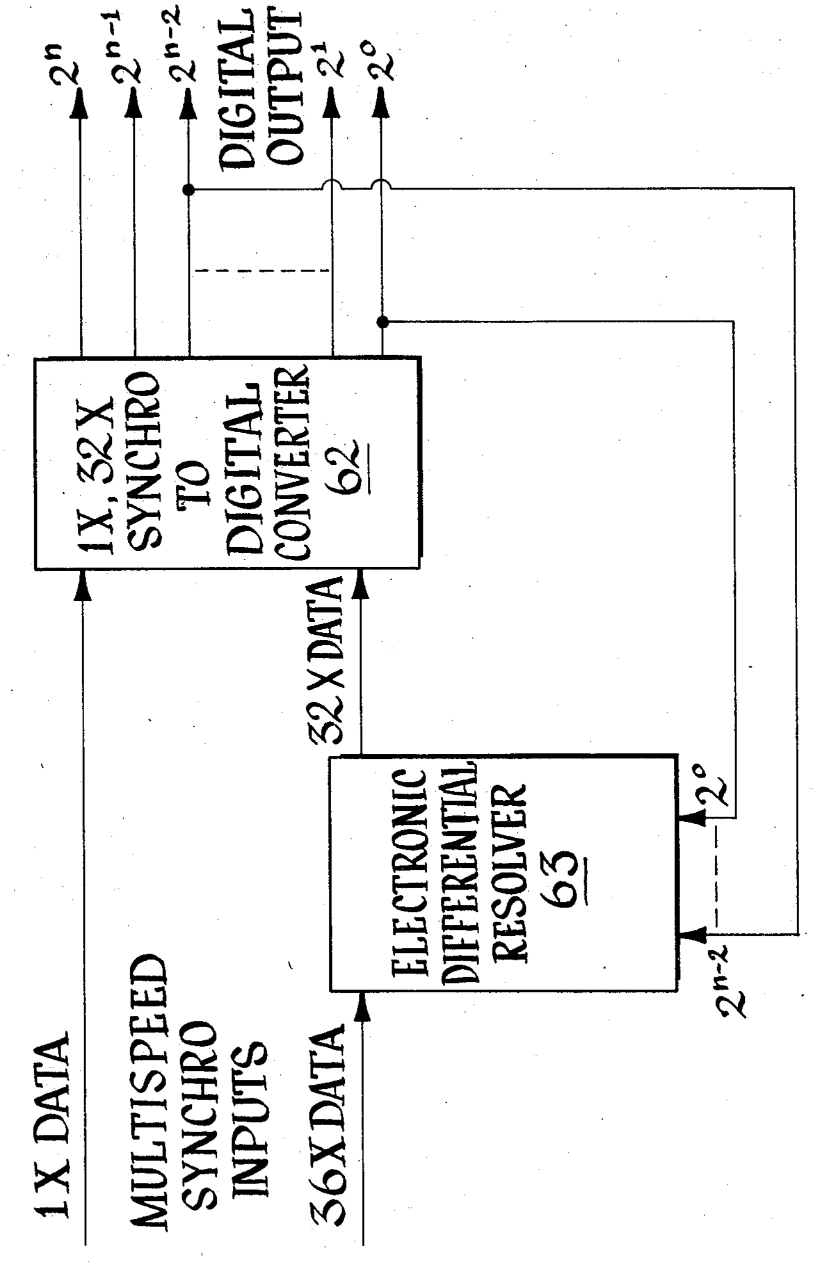
FIGURE 7 is a functional block diagram of a different form of analog to digital signal converter constructed in accordance with the invention.

FIGURE 7 of the drawings illustrates a different form of analog to digital converter constructed in accordance with the teachings of the present invention. In the analog to digital converter shown in FIGURE 7, the incoming coarse (1×) synchro data in analog form is supplied directly to one input of an analog to digital converter 62 which, for example, may be identical in construction and operation to the analog to digital converter shown in FIGURE 1 of the drawings, but without the need for the adder 18. The incoming fine (36×) synchro data in analog form is supplied to an input of an electronic differential resolver 63 which is similar in construction and operation to the electronic differential resolver shown in FIGURE 2 of the drawings. The electronic differential resolver 63 has its output connected to the fine (32×) input terminal of the analog to digital converter 62. The digital feedback signal required for the electronic differential resolver 63 is supplied from the output of the analog to digital converter 62.

In the embodiment of the converter shown in FIGURE 7 it is assumed that the fine analog signal data which is available to be supplied to the input of the electronic differential resolver 63 is a 36 speed (36×) signal. That is to say that the signal is 36 times as fast as the coarse (1×) signal supplied directly to the input of the analog to digital converter 62. It is further assumed that the analog to digital converter 62 is designed to operate only with a fine analog signal which is 32 times (32×) as fast as the coarse actual speed signal supplied thereto. With the FIGURE 7 circuit, all that is required is that an appropriate summed digital feedback signal is derived from the output of the converter 62 which, when combined in the electronic differential resolver 63 with the input 36 speed (36×) position signal, provides the required 32 speed (32×) position signal for use at the input of the analog to digital converter 62. In the example cited, the electronic differential resolver 63 is controlled by a digital feedback signal which excludes the two most significant bits and thus provides a signal rotation of 4 revolutions for each full revolution of the coarse or one speed signal. By subtracting these 4 revolutions from the 36 speed (36×) position input analog signal, 32 speed (32×) position output analog signals will be produced at the output of the electronic differential resolver. With a one speed (1×) and 32 speed (32×) input analog signals supplied thereto, the analog to digital converter 62 will produce a natural binary digital output for subsequent signal processing.

In considering the embodiments of the invention herein disclosed it should be noted that all of the circuits described are low wattage, signal level circuits susceptible to construction in modular form and, hence, can be readily micro-miniaturized using integrated circuit manufacturing techniques. Further, the resulting signal converter is all electronic, highly accurate, fast responding and requires a minimum number of transformers. Since it provides both coarse and fine signal processing channels, it is capable of multi-speed operation, and can be readily adapted to multiplexed operation with any desired number of signal sources. Further, the invention makes available a novel means for converting digital signals of one value to digital signals of a selected different value for use in digital to analog converters and the like. Thus, it can be appreciated that the invention provides new and improved signal converters for converting analog signals to digital signals and for converting digital signals to analog signals, etc.

Having described several embodiments of new and improved analog to digital and digital to analog signal converters constructed in accordance with the invention, it is believed obvious that other modifications and variations of the present invention are possible in the light of the above teachings. It is therefore to be understood that changes may be made in the particular embodiments of the invention described which are within the full intended scope of the invention as defined by the appended claims.

What I claim as new and desire to be secured by Letters Patent of the United States is:

1. An electronic analog to digital converter for converting analog signals to digital signals having a digital value representative of input analog signals comprising first differential resolving means for adding signals of an analog angular input and a digital angular input at a first speed to generate an output signal representative of the difference between said angular input signals at said first speed, second differential resolving means for adding signals of an analog angular input and a digital angular input at a second speed to generate an output signal representative of the difference between said angular input signal at said second speed, a transfer network for summing said output signals and which is operatively associated with further signal processing means including a voltage to frequency converter to provide a variable frequency output signal that causes reversible counter means to count up or down at variable rates to provide a pulsed wave-form digital output signal, adding means coupled to the output from said reversible counting means for adding together the outputs from selected counter stages thereof, means for coupling the output from said adding means back to the input of said first differential resolving means, and means for coupling the outputs from all counter stages back to the input of said second differential resolving means.

2. The converter set forth in claim 1 wherein the adding means is a digital adding means for adding the outputs from at least two counter stages of the reversible counting means in digital form and supplying the resultant sum signals to the differential resolving means in digital form.

3. The converter set forth in claim 2 further characterized by a transfer network means having its input coupled to the output of the first and second differential resolver means, demodulator and sample and hold network means having its input coupled to the output from said transfer network means, and voltage to frequency converting means having its input coupled to the output from said demodulator and sample and hold network and having its output coupled to the input of the reversible counting means.

4. The analog to digital converter set forth in claim 1 further characterized by coarse and fine differential resolving means each having their outputs operatively coupled to the input of said reversible counting means, the coarse differential resolving means having coarse value analog signals supplied thereto and the fine differential resolving means having fine value analog signals supplied thereto, the output from said adding means being connected back to said fine differential resolving means in a closed loop feedback manner as one of the input signals thereto and means for coupling the output from all the counter stages of said reversible counting means back to the input of said coarse differential resolving means in a closed loop feedback manner as one of the input signals thereto.

5. The converter set forth in claim 4 wherein the adding means is a digital adding means for adding the outputs from at least two counter stages of the reversible counting means in digital form and supplying the resultant sum signal to the fine differential resolving means in digital form, the output signal from all the counter stages of said reversible counter being supplied to said coarse differential resolving means in digital form.

6. The converter set forth in claim 5 further characterized by a transfer network means having its input coupled to the output of both the fine and coarse differential resolver means, demodulator and sample and hold network means having its input coupled to the output from said transfer network means, and voltage to frequency converting means having its input coupled to the output from said demodulator and sample and hold network and having its output coupled to the input of the reversible counting means.

7. A multiplexed analog to digital converter according to claim 3 further characterized by a plurality of input analog signal channels, an input analog multiplexer having the plurality of input analog signal channels coupled to the input thereof and having its output coupled to the input of the differential resolving means, a plurality of signal processing channels, one for each of the input analog signal channels, each of said signal processing channels comprising demodulator and sample and hold network means, voltage to frequency converting means, and reversible counting means, multiplexed transfer network means operatively coupled intermediate the output of said differential resolving means and the inputs of all said signal processing channels for operatively coupling the output from said differential resolving means to a desired one of said signal processing channels, an output register, a digital multiplexer operatively coupled intermediate the outputs of all said signal processing channels and the input to said output register for coupling the output from a selected one of said signal processing channels to the output register, the adding means having its input operatively coupled through the digital multiplexer to the output from the selected signal processing channel, and multiplexing timing generator means having its output supplied to said input analog multiplexer, said multiplexed transfer network means, and said digital multiplexer for controlling the operation of the same.

8. A multiplexed analog to digital converter according to claim 6 further characterized by a plurality of input analog signal channels, an input analog multiplexer having the plurality of input analog signal channels coupled to the input thereof and having its output coupled to the input of both the fine and coarse differential resolving means, a plurality of signal processing channels, one for each of the input analog signal channels, each of said signal processing channels comprising demodulator and sample and hold network means, voltage to frequency converting means, and reversible counting means, multiplexed transfer network means operatively coupled intermediate the output of said both the fine and coarse differential resolving means and the inputs of all signal processing channels for operatively coupling the output from said fine and coarse differential resolving means to a desired one of said signal processing channels, an output register, a digital multiplexer operatively coupled intermediate the outputs of all said signal processing channels and the input to said output register for coupling the output from a selected one of said signal processing channels to the output register, the adding means having its input operatively coupled through the digital multiplexer to the output from a selected signal processing channel, means for coupling an input of the coarse differential resolving means through the digital multiplexer to the output from the reversible counting means of a selected signal processing channel, and multiplexing timing generator means having its output supplied to said input analog multiplexer, said multiplexed transfer network means and said digital multiplexer for controlling the operation of the same.

9. An analog to digital converter for converting an analog signal to a digital signal having a digital value representative of the value of the input analog signal comprising additional differential resolving means for adding signals in analog form to signals in digital form and for deriving a resultant output signal representative of the sum of the applied input signal, and analog to digital converter means as set forth in claim 1 having the output from the additional differential resolving means coupled to the input thereof, the output from selected counter stages of said analog to digital converter means being coupled back to the input of said additional differential resolving means.

10. An analog to digital converter for converting an analog signal to a digital signal having a digital value representative of the value of the input analog signal comprising additional differential resolving means for adding signals in analog form to signals in digital form and for deriving a resultant output signal representative of the sum of the applied input signal, and analog to digital converter means as set forth in claim 6 having the output from the additional differential resolving means coupled to the input thereof, the output from selected counter stages of said analog to digital converter means being coupled back to the input of said additional differential resolving means.

11. An electronic analog to digital converter for providing a natural binary digital output signal when combining an analog signal with a non-binary multiple of said analog signal which includes differential resolving means for adding signals in analog form to signals in digital form for deriving a resultant output signal representative of the sum of the applied input signals, demodulator means to develop a DC error signal from the output signal of the differential resolving means, voltage to frequency converter means driven by said DC error signal to provide a variable frequency output signal that causes reversible counting means to count up or down at variable rates to provide a pulse wave-form digital output signal, adding means coupled to an output from said reversible counting means for adding together outputs from selected counter stages thereof, and means for coupling the output from said adding means back to the input of said differential resolving means in a closed loop feedback manner as one of the input signals thereto.

References Cited

UNITED STATES PATENTS

| | | | |
|---|---|---|---|
| 3,045,230 | 7/1962 | Tripp et al. | 340—347 |
| 3,105,231 | 9/1963 | Gordon et al. | 340—347 |
| 3,127,601 | 3/1964 | Kaenel | 340—347 |

MAYNARD R. WILBUR, Primary Examiner

C. D. MILLER, Assistant Examiner